United States Patent
Felgate et al.

(10) Patent No.: US 9,501,782 B2
(45) Date of Patent: Nov. 22, 2016

(54) MONITORING SYSTEM

(71) Applicants: Arthur Everett Felgate, Richfield, MN (US); Mark Gobel, West St.Paul, MN (US)

(72) Inventors: Arthur Everett Felgate, Richfield, MN (US); Mark Gobel, West St.Paul, MN (US)

(*) Notice: Subject to any disclaimer, the term of this patent is extended or adjusted under 35 U.S.C. 154(b) by 63 days.

(21) Appl. No.: 14/222,174

(22) Filed: Mar. 21, 2014

(65) Prior Publication Data

US 2014/0197944 A1   Jul. 17, 2014

Related U.S. Application Data

(63) Continuation-in-part of application No. 13/052,070, filed on Mar. 19, 2011.

(60) Provisional application No. 61/340,730, filed on Mar. 20, 2010.

(51) Int. Cl.
   *H04M 11/04* (2006.01)
   *G06Q 30/02* (2012.01)
   *G08B 27/00* (2006.01)

(52) U.S. Cl.
   CPC ......... *G06Q 30/0224* (2013.01); *G08B 27/008* (2013.01)

(58) Field of Classification Search
   CPC ............................ G08B 25/10; G08B 25/009
   USPC ....................................................... 340/539.1
   See application file for complete search history.

(56) References Cited

U.S. PATENT DOCUMENTS

| | | | |
|---|---|---|---|
| 5,615,266 A | 3/1997 | Altschuler et al. | |
| 5,790,407 A * | 8/1998 | Strickland | G05B 19/042 212/284 |
| 6,181,244 B1 | 1/2001 | Hall et al. | |
| 6,630,754 B1 | 10/2003 | Pippin | |
| 6,831,557 B1 | 12/2004 | Hess | |
| 6,864,789 B2 | 3/2005 | Wolfe | |
| 6,987,457 B2 | 1/2006 | Yin et al. | |
| 7,747,705 B1 | 6/2010 | Raja | |
| 2003/0063003 A1 | 4/2003 | Bero et al. | |
| 2005/0200475 A1 | 9/2005 | Chen | |
| 2006/0095165 A1* | 5/2006 | Hackel | F02D 41/266 701/1 |
| 2007/0214180 A1 | 9/2007 | Crawford | |
| 2007/0214264 A1 | 9/2007 | Koister | |

(Continued)

FOREIGN PATENT DOCUMENTS

WO   2011011404 A1   1/2011

*Primary Examiner* — Suhail Khan
(74) *Attorney, Agent, or Firm* — Christensen Fonder P.A.

(57) ABSTRACT

A system for remote monitoring of conditions at a site and transmitting alerts to interested parties' mobile devices via a social networking service is described. The system employs a wireless communications device, partially exposed outside a small, metal enclosure, to transmit SMS (text message) alerts to a social networking site. Interested parties, including other devices, receive the alerts by simply subscribing to the 'user' device, and alarm threshold conditions are established autonomously by the device. Thus, no configuration of the device by interested parties is required. Temperature alerts are generated by the device without user-configured or fixed thresholds. A wall-mounted installation of the device conceals the external antenna within the wall cavity.

20 Claims, 8 Drawing Sheets

(56) References Cited

U.S. PATENT DOCUMENTS

| | | | |
|---|---|---|---|
| 2007/0244653 A1* | 10/2007 | Maurer | G08B 21/12 |
| | | | 702/30 |
| 2008/0057916 A1 | 3/2008 | Gamm et al. | |
| 2008/0064413 A1 | 3/2008 | Breed | |
| 2008/0155080 A1 | 6/2008 | Marlow et al. | |
| 2008/0207232 A1 | 8/2008 | Rice et al. | |
| 2009/0089612 A1* | 4/2009 | Mathew | G06F 11/1076 |
| | | | 714/6.2 |
| 2009/0117942 A1 | 5/2009 | Boningue et al. | |
| 2009/0141899 A1* | 6/2009 | Huang | H04L 9/0838 |
| | | | 380/270 |
| 2009/0144369 A1 | 6/2009 | Brown | |
| 2009/0156254 A1 | 6/2009 | Montes | |
| 2009/0172773 A1 | 7/2009 | Moore | |
| 2009/0187120 A1* | 7/2009 | Nycz | A61B 5/076 |
| | | | 600/587 |
| 2009/0264140 A1* | 10/2009 | Bain | G06Q 10/107 |
| | | | 455/466 |
| 2009/0278681 A1* | 11/2009 | Brown | G08B 19/005 |
| | | | 340/539.22 |
| 2009/0300525 A1 | 12/2009 | Jolliff et al. | |
| 2009/0321039 A1* | 12/2009 | Therrien | E04H 1/1238 |
| | | | 165/11.1 |
| 2009/0326981 A1 | 12/2009 | Karkanias et al. | |
| 2010/0005152 A1 | 1/2010 | Ramamurthy | |
| 2010/0030578 A1 | 2/2010 | Siddique et al. | |
| 2010/0056944 A1* | 3/2010 | Keith | A61B 5/015 |
| | | | 600/549 |
| 2010/0107661 A1* | 5/2010 | Awwad | B60H 1/321 |
| | | | 62/80 |
| 2010/0127880 A1* | 5/2010 | Schechter | G01K 1/024 |
| | | | 340/584 |
| 2010/0174709 A1 | 7/2010 | Hansen et al. | |
| 2010/0231445 A1* | 9/2010 | Tarlow | G01S 19/13 |
| | | | 342/357.28 |
| 2010/0248681 A1 | 9/2010 | Phills | |
| 2010/0251751 A1* | 10/2010 | Lurken | F25D 3/105 |
| | | | 62/440 |
| 2010/0273517 A1* | 10/2010 | Pinheiro | H04B 1/036 |
| | | | 455/522 |
| 2010/0299615 A1 | 11/2010 | Miluzzo et al. | |
| 2011/0015802 A1 | 1/2011 | Imes | |
| 2011/0230160 A1 | 9/2011 | Felgate | |
| 2012/0029718 A1* | 2/2012 | Davis | G05B 15/02 |
| | | | 700/295 |

\* cited by examiner

MONITORING SYSTEM

CROSS REFERENCE TO RELATED APPLICATIONS

The applications listed below are the only application related to this application. This application is a continuation in part of Utility patent application Ser. No. 13/052,070 filed on Mar. 19, 2011 which in turn claims priority under 35 USC 119(e) from Provisional application No. 61/340,730 filed on Mar. 20, 2010.

STATEMENT REGARDING FEDERALLY SPONSORED RESEARCH OR DEVELOPMENT

No invention claimed in this application was made under Federally sponsored research or development.

THE NAMES OF THE PARTIES TO A JOINT RESEARCH AGREEMENT

Not Applicable

REFERENCE TO A SEQUENCE LISTING

Not Applicable

BACKGROUND OF THE INVENTION

The present invention is in the technical field of industrial and home automation. More particularly, the present invention is in the technical field of automatic alarm systems. The prior art in such technical field includes public telephone-or-cellular-based voice dialers that notify end-users directly via phone call or that report data to an interactive alarm processor. Existing remote notification systems all require at least some user programming of configuration data, including alarm thresholds.

BRIEF SUMMARY OF THE INVENTION

The present invention is a monitoring system which wirelessly transmits alerts directly to a social networking site and eliminates the need for user-configuration and fixed sensor thresholds.

DETAILED DESCRIPTION OF THE INVENTION

Figure 1:
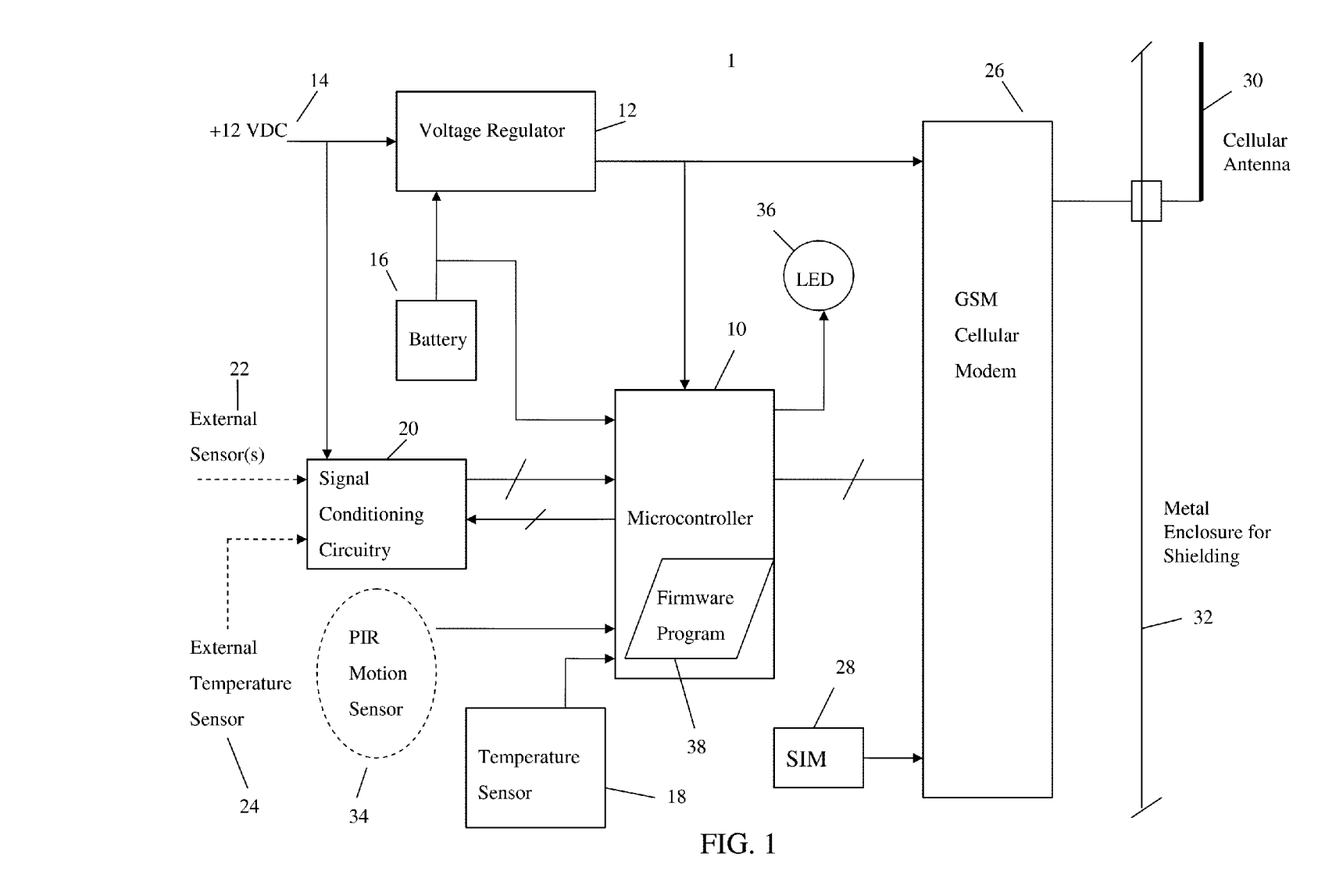
FIG. 1 is a block diagram of the present invention.
Figure 2:
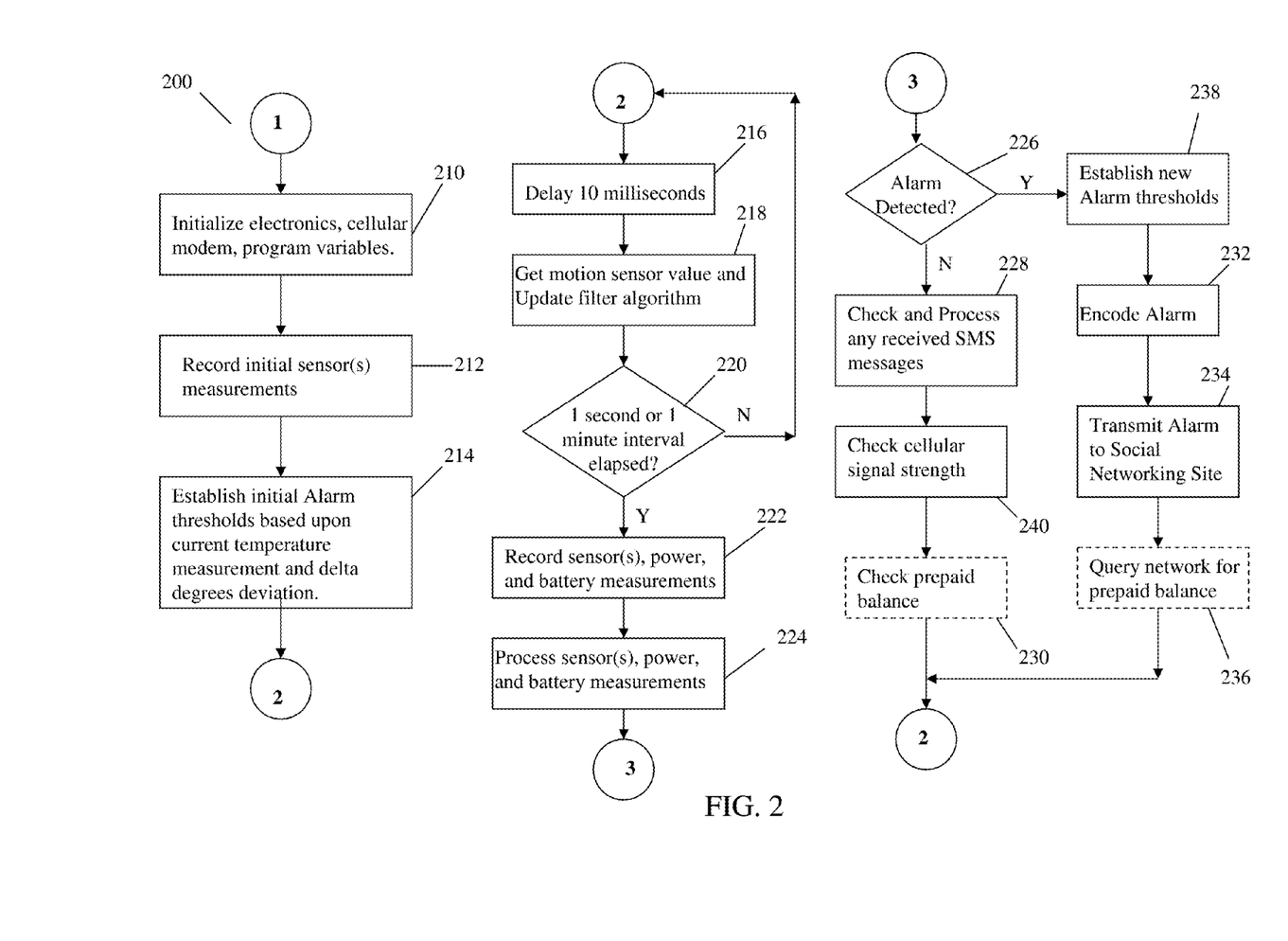
FIG. 2 is a flow chart of the firmware application program.

Monitoring System 1 comprises One or more sensors; A microcontroller 10; A wireless communications device configured to transmit wireless alerts to a social networking site. Referring now to the invention in more detail, in FIG. 1 there is shown a microcontroller 10 with embedded Firmware Program 38 controlling visual indicator such as an LED 36 and powered via Voltage Regulator 12, connected to either an external power source 14 or a Battery 16. The battery may be of any type providing a suitable voltage to power the Indicators and circuitry of the environmental monitoring system via the Signal Conditioning circuitry. The Signal Conditioning Circuitry 20 interfaces external power 14 or, the Battery 16 voltage, one or more Sensor(s) to the Microcontroller 10. The Sensor(s) may be of many types such as: Integral Temperature Sensor 18, optional PIR (Passive Infrared) Motion Sensor 34, Power supply Monitors, Humidity Sensors. These sensors are interfaced to the Microcontroller 10. Each sensor has associated with it data resulting from measurements made during a calibration phase. This data is analyzed to determine one or more ranges of acceptable excursions of the sensor data. This determination is used to determine sensor excursions outside the normal operating range(s) for reporting purposes. The determination of acceptable operating range may continue beyond the original calibration phase. Connected to the Microcontroller 10 is a wireless communications interface comprised of a Cellular Modem 26 and Cellular Antenna 30. The cellular modem 26 may be of any suitable type including, but not limited to CDMA (Code Division Multiple Access) or GSM (Global System for Mobiles). In some embodiments at least a portion of the antenna exposed outside a Metal Enclosure for Shielding 32, in order to enable wireless communications. Cellular network services are enabled via a SIM (Subscriber Identity Module) card 28 or other similar device. A Metal Enclosure for Shielding 32 covers most components except for external power 14, the Cellular Antenna 30, inherent to the wireless communications interface, and Sensor(s) 22. PIR Motion Sensor 34 is also partially enclosed by the Metal Enclosure for Shielding 32. In more detail, still referring to the invention of FIG. 1 the Microcontroller 10 executes the system's application from instructions within the Firmware Program 38 and measures the state of a complement of sensors including but not limited to: onboard Temperature Sensor 18, PIR Motion Sensor 34, external +12 VDC 14, the Battery 16, and optional External Sensor(s) 22 and External Temperature Sensor 24. Additional Sensor(s) 22 may comprise one or more of a humidity sensor, a water sensor, a water level sensor, a relay contact closure or a magnetic switch. Changes in any of these measurements may cause the Microcontroller 10 to transmit a digital text message such as an SMS (Short Messaging System, i.e. standard Text Message) alert via the wireless communication interface. The SMS alert is addressed to a fixed telephone number or short code associated with a social networking service. This fixed address may be factory configured or hard-coded into the Firmware Program 38. In addition, the calibration period may be preprogrammed to any desired period and automatically terminated. Thus, no programming of interested parties' notification phone numbers or any other parameters is required. A flow chart of the Firmware Program 38 is shown in FIG. 2. It will be appreciated that phone numbers, calibration periods, sensor thresholds, and many other parameters could also be input into the device by a user.

One approach would be to configure the phone numbers via an SMS command, another would be for the device to capture the Caller ID information of an incoming circuit-switched call, or to use the phone number of a received SMS message. Yet still another method is for the phone number to be entered via a keypad attached to the device. Cellular network service for the device is enabled by SIM card 28, or similar device, which can be purchased from a GSM cellular carrier and installed in the GSM Cellular Modem 26. Alternatively a CDMA device or any mobile modem can be used. To transmit SMS text messages or wireless alerts via the cellular network a sufficiently strong cellular signal must be present in the area. The Cellular Antenna 30, inherent to the wireless communications device, must be located outside the Metal Enclosure for Shielding 32 to maximize the signal strength for the Cellular Modem 26 to transmit wireless SMS alerts via the cellular network. In addition to transmitting SMS alerts the wireless communication device, comprised of the Cellular Modem 26 and Cellular Antenna 30, may also receive and process SMS text messages or incoming circuit-switched calls. It will be appreciated that equivalents of the GSM Cellular Modem 26 and Cellular Antenna 30 may be employed and remain within the concept of the present invention.

To generate sensor alerts the invention of FIG. 1 uses a novel approach which requires neither fixed nor user-configured sensor alarm thresholds. Rather, the system adopts the behavior of a social networking user by simply issuing a single alert to the social networking service whenever a measurement as measured by a Sensor 18 or the optional External Temperature Sensor 24 changes by some number of degrees. This delta criterion may be either hard-coded in the Firmware Program 38, user-configurable or learned during use or learned during the calibration period. In this way the present invention enables a wireless sensor alert which avoids predefined or user-configured thresholds. Since the initial condition of the system is defined by the ambient temperature in which the system is powered on, and not defined by any circuitry in the device, any subsequent sensor alerts may occur at different values between different power cycle events. It will be appreciated that this same approach may be taken with the interpretation of inputs from any sensor having a suitable output.

The Monitoring System 1 depends upon the collaboration between the Micro-controller 10 and processing at a central monitoring site ("site") 316 in the internet cloud that the Micro-Controller 10 connects to via the cellular service provided. The central monitoring site 316 contains an incident management engine ("engine") that generates messages via cell phone and email ("Alerts") to users of the central monitoring site 316. As part of the solution, temperature excursions, component failures and power failures ("Events") are transmitted from the microcontroller to the monitoring site. The Incident Management software at the monitoring 316 site is designed around processing the Events data based upon the class of the Event, its time count and other data. The difference between this approach and conventional approaches is the cooperative nature of the link between the microcontroller 10 and the monitoring site 316 and the rule sets required therein.

When an Event is received by the monitoring site 316, it carries with it the information to assist the engine. After that point, the monitoring site still uses the Event definition to further process the Event and generates alerts which are transmitted via cell phone or email to system users.

Where cellular efficiency is of concern, a key to cellular efficiency is to have the Microprocessor 10 reduce the number of transmissions to the monitoring site 316 (via an appropriate protocol) yet have those transmissions contain enough information to inform the incident management engine so that it takes proper action.

Figure 6:
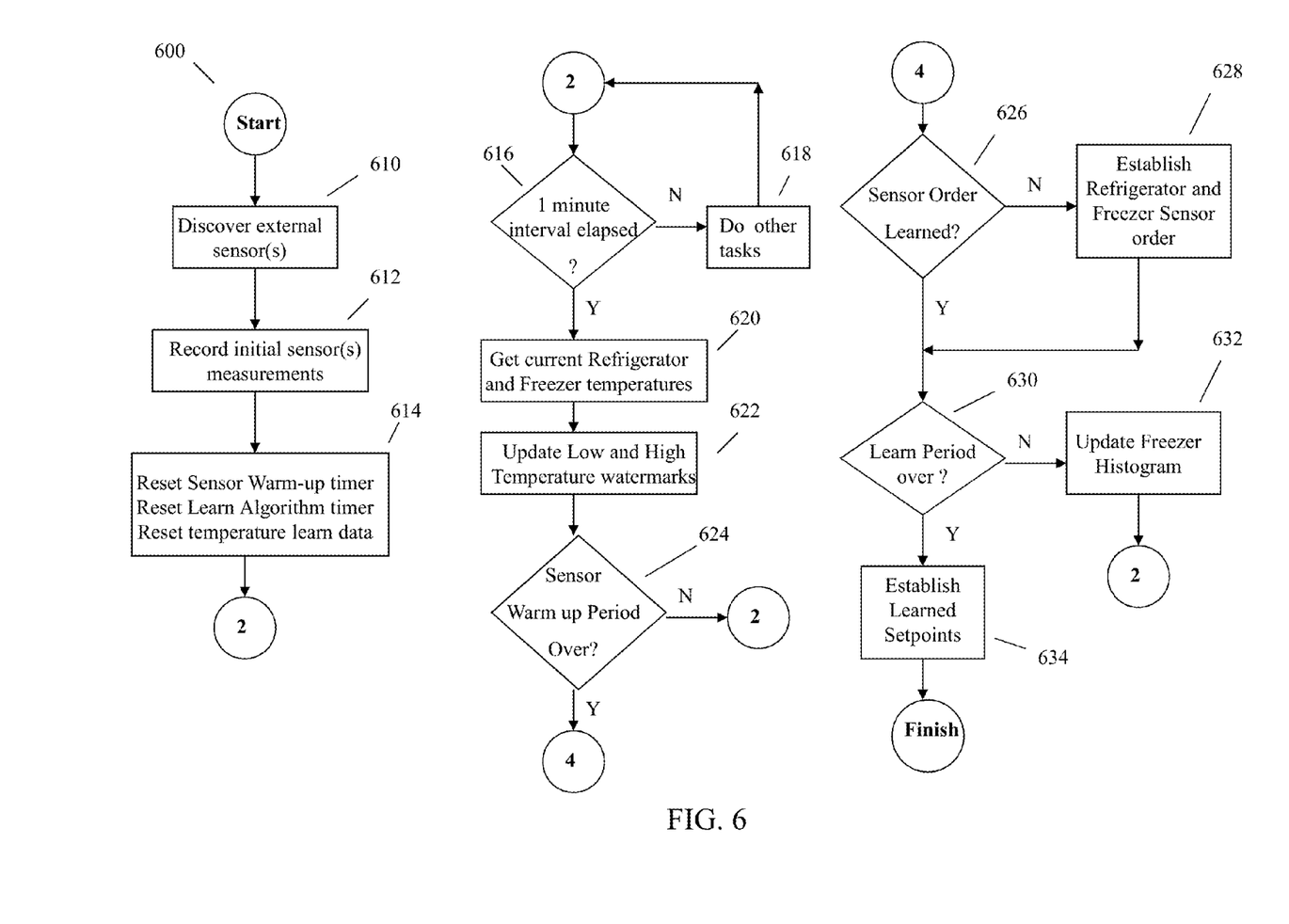
FIG. 6 is a flowchart of a method of establishing sensor thresholds.

One example of a method of establishing sensor thresholds is illustrated in FIG. 6. Here in step 610 of method 600 the presence of any external temperature sensors is discovered. Then, step 612 records some initial sensor measurements. Next, step 614 resets a sensor warm up timer and a sensor learn timer. In one implementation, the sensor warm up period is 2 hours, and the sensor learn period is 24 hours. After these initialization routines are completed the learn method 600 enters a loop until the learn method 600 is complete. In step 616 the program checks to see if a 1 minute interval has elapsed. If not, other tasks 618 are performed, and step 616 is repeated until a 1 minute interval has elapsed. After a 1 minute interval has elapsed step 620 of method 600 gets current refrigerator and freezer temperature measurements. Step 622 uses these most recent temperature values to update the low and high water mark values recorded for both the refrigerator and freezer. Thus, as temperature falls, for example, in the freezer, the lowest value recorded will get replaced by colder and colder readings from step 620. In this fashion, the full operating temperature ranges of the refrigerator and freezer are characterized.

If the sensor warm up period in step 624 has not expired, this cycle will repeat beginning at step 616 again.

When the sensor warm up period in step 624 has elapsed step 628 of method 600 determines the order of the refrigerator and freezer temperature sensors by assigning the sensor with the colder temperature range, determined by step 622, to the freezer.

Next, step 630 of method 600 checks if the sensor learn period has expired. If not, step 632 of method 600 updates the histogram data for the freezer sensor, determined earlier in step 62. The histogram data is used later in the learn method 600 to identify freezer defrost cycles and filter them from the normal operating temperature range of the freezer.

After step 632 of method 600 is complete, the learn method 600 loop is repeated beginning at step 616.

Eventually, after many loop iterations, step 630 of method 600 will determine the learn period is over. When this occurs, step 634 of method 600 will establish the final learned low and high temperature thresholds for both the refrigerator and freezer. Step 634 may take into account the freezer temperature histogram data collected in step 632 and use this data to identify and exclude normal freezer defrost temperature excursions from the freezer thresholds.

Figure 7:
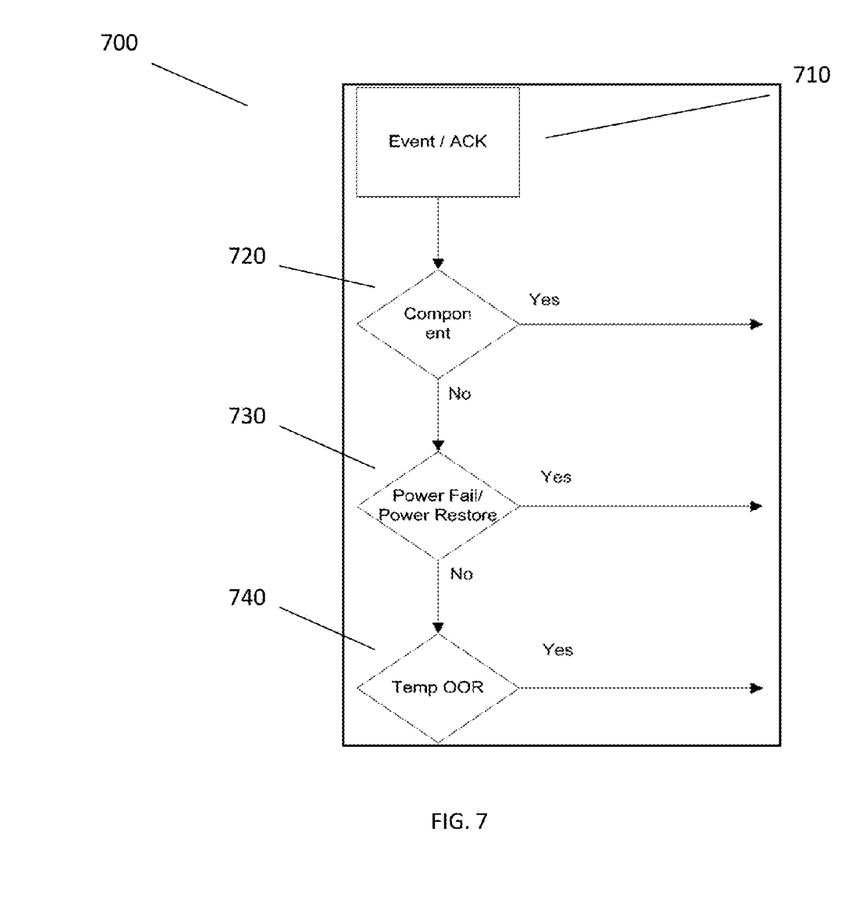
FIG. 7 is a flowchart showing an example of event processing by an event receiver.

In an alternative embodiment the establishment of sensor thresholds may be accomplished by a an event receiver 700 located with the Social Networking Service 310 of the above mentioned SMS alerts, executing software or firmware defined for the purpose. The allocation of sensor threshold establishment related processing between the receiver of the alerts and the microprocessor co-located with the signal conditioning circuitry is a design choice based on the desired levels of SMS traffic and the availability of microprocessor capability at the Social Networking Service 310.

Figure 8:
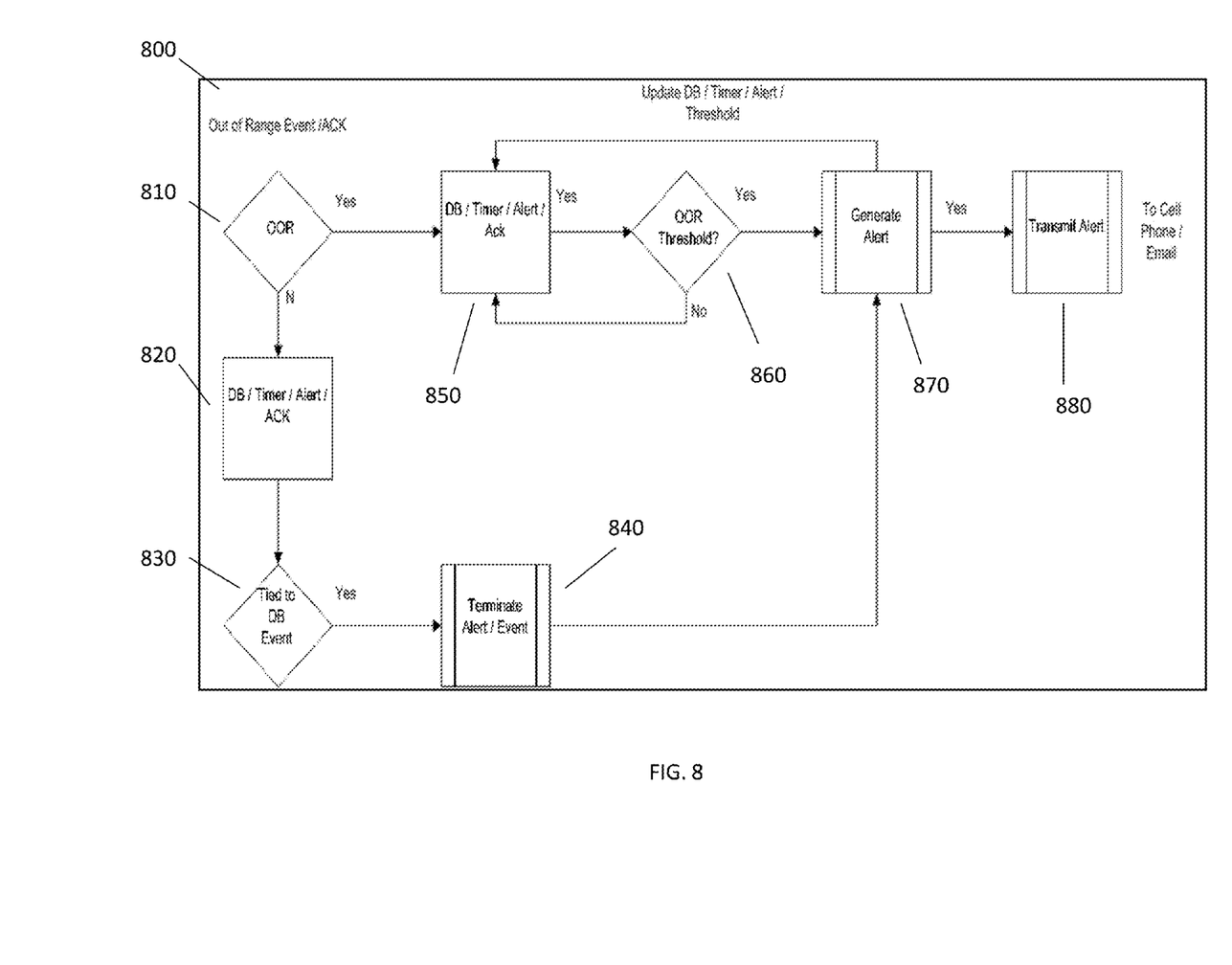
FIG. 8 is a flowchart showing an example of event generation by a site monitor.

In some embodiments of the system sensor inputs are processed to assure that only alarm conditions are transmitted as events. FIGS. 7 and 8 show the allocation of processing for this embodiment.

FIG. 7 illustrates an example of an event being processed by the event receiver software within the Social Networking Service 310. The event 710 is first evaluated as a potential component failure in step 720. Having not met the criteria as a component failure, the event 710 is next evaluated in step 730 as a potential Power Fail/Power Restore. Having not met this criteria, either, the event 710 is finally evaluated as a Temperature out-of-range ("Temp OOR") event.

FIG. 8 next illustrates an example of the event 710 received in method 700, and evaluated as an OOR event generating a later event ("Alert") by the Incident Management software at the monitoring 316 site.

Step 810 of method 800 first evaluates the event 710 as whether or not it is an OOR event. In the case in which it is not it is passed to the DB/Timer/Alert ruleset 820 and evaluated as to whether it is a part of any outstanding OOR event in step 830. If it is, then as shown in step 840 that event is terminated. The reason is because the event 710 is not an OOR event, but based upon its class, time count and other data the Incident Management software recognizes it as related to an OOR event in process; the microprocessor 10 has ceased communicating OOR data and instead has signaled the OOR event no longer exists based upon the learn criteria in method 600.

If instead in step 810 the event 710 meets the criteria as indeed being an OOR event, it is passed to the DB/Timer/Alert ruleset 850. Here, the event 710 is compared to the Incident Management software's own OOR threshold 860. This may be different than the learned setpoints the microprocessor 10 established in step 634 of method 600. This illustrates the nature of the microprocessor 10, with its learned thresholds from method 600, working cooperatively with the Incident Management software at the monitoring site 316, with its own rulesets. If the event does exceed the Incident Management software's own OOR threshold based upon the event's class, time count, and other data, then in step 870 an Alert is generated, and in step 880 it is transmitted to a cell phone or email address.

The distinguishing difference between the event 710 received and the Alert generated in step 870 and transmitted in step 880 is that the event received in method 700 was transmitted by the microprocessor 10, using learned thresholds established by it in method 600; whereas the Alert generated in step 870 and transmitted in step 880 is based upon the class of the event 710, its time count, and other data; this illustrates the cooperative nature of communication from the microcontroller 10 and the monitoring site 316.

In the event that external power 14 is unavailable the Battery 16 will provide backup power to the system in order to maintain operation. The Microcontroller 10 may monitor the battery voltage and transmit an SMS alert if the battery capacity is below some minimum threshold.

In further detail, still referring to FIG. 1 the Microcontroller 10 has an 8-bit word length and onboard at least 32 Kbytes of program ROM space and 1 Kbyte of RAM memory sufficient to store and execute the operating program and data structures for the remote monitoring application illustrated in FIG. 2. In particular, the Microcontroller 10 should have sufficient RAM memory buffer space to store an SMS text message of at least 160 bytes. The Microcontroller 10 also has onboard resources such as timers, A/D converter, serial and I/O ports sufficient for interfacing to the rest of the system electronics and supporting the program application. Persons possessing ordinary skill in the art of developing embedded systems will be familiar with the many different choices of low-cost, off-the-shelf, readily available microcontrollers that can be used to implement this design. They will also be able to accurately estimate the program size necessary to implement the functions of this invention as described herein. The embedded Firmware Program 38, which is illustrated in FIG. 2, would typically be written in C and assembly language.

The Voltage Regulator 12 must have enough capacity to provide pulse currents demanded by the GSM Cellular Modem 26 during SMS transmissions from a battery as small as a 9V alkaline.

If the largest dimension of the enclosure is smaller than ½ wavelength of the cellular frequency or the enclosure is metallic, then the Cellular Antenna 30, inherent to the wireless communication, must be located outside the Metal Enclosure for Shielding 32. For wall-mounted installations the Cellular Antenna 30 may be located within the wall cavity, concealing it from unauthorized personnel in order to prevent easy disabling of the wireless communications functionality.

The construction details of the invention are all electronics except the Battery 16, GSM Cellular Modem 26, Cellular Antenna 30, and SIM 28 are implemented on a single, double-sided printed circuit board.

The invention meets all required FCC and cellular carrier approvals and certifications. A Metal Enclosure for Shielding 32 may be necessary to ensure FCC radiated emissions compliance, so the Cellular Antenna 30, inherent to wireless communications, must be located outside the enclosure. To prevent this unsecured component from being compromised by unauthorized personnel the Cellular Antenna 30 may be attached to the bottom surface of the Metal Enclosure for Shielding 32 when the device is wall-mounted. This configuration will conceal the Cellular Antenna 30 within the wall cavity, decreasing the vulnerability of the invention to disablement by mechanical removal of the Cellular Antenna 30. Still another method to prevent the Cellular Antenna 30, inherent to the wireless communication, from being removed is to secure it with epoxy.

The advantages of the present invention include, without limitation, the ability for a plurality of interested parties, including other devices, to simultaneously receive remote environmental wireless alerts on their mobile devices via a social networking service. Direct communication from the device to the fixed address associated with a social networking service via commonly supported SMS text messages eliminates the need to configure alert notification addresses into the device. Propagation of the alert message from the social networking service to subscribers allows lower cost notification than existing alarm systems, since the device only incurs the charge to transmit a single wireless alert to the social networking service; all subscribers can then be forwarded the alarm message from the social networking service. In the case in which a follower is a similar device, this technique allows autonomous telemetry. For example, one device could sense a sensor changing state and communicate that event to the social networking site; another subscriber device could then act upon that information.

The present invention provides further advantage in that no user configuration of alarm threshold(s) is required. Because only a single wireless alert is transmitted to the social networking service when environmental conditions change at the location, regardless of the number of interested parties, or subscribers to the device, the present invention allows multiple sensor deviations to be communicated cost-effectively to interested parties without the need for explicit thresholds. Because the data associated with each sensor resides in a memory accessible to the same microprocessor that can access all other sensors, the thresholds for any one sensor may be determined as function of the values and thresholds for one or more other sensors. For example battery life alerts may be generated at different sensor readings of battery voltage at different temperature sensor readings.

The location of the Cellular Antenna 30, outside the Metal Enclosure for Shielding 32, allows the system to be physically smaller than the Cellular Antenna 30 and/or allows the enclosure to be constructed of metal. A small enclosure offers the benefits of aesthetic or unobtrusive installation or protection of small personal property. A metal enclosure offers the benefits of protection of the internal electronics from burglars or unauthorized personnel and electromagnetic shielding of the internal electronics. An envisioned wall-mounted installation of the system could locate the Cellular Antenna 30 within the wall cavity, allowing a much smaller solution for enclosing the remaining portion of the wireless communications device while still preventing the system from being disabled by easy removal of the Cellular Antenna 30, inherent to the communications device.

In broad embodiment, the present invention is any type of portable, mobile or fixed wireless communication-based remote monitoring system which alerts a plurality of interested parties, including other devices, of environmental conditions by leveraging the social network to which they subscribe, avoiding the need for configuration of subscriber address information, and which further eliminates user-configured or fixed temperature alarm threshold circuitry or information.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The FIG. 2 flowchart of the Firmware Program 38 illustrates one exemplary method 200 for leveraging a social networking service to deliver an alarm to a plurality of receivers. In step 210 method 200 initializes all device electronics, initializes firmware program 38 variables, and powers on and initializes the GSM Cellular Modem 26. Step 212 of method 200 then records initial sensor readings corresponding to the Temperature sensor 18 and optionally the external temperature sensor 24 and optional external sensor(s) 22. It will be recognized that these sensor readings are not predefined, and are based upon the current environmental conditions at the moment the device is turned on. Alternatively alarm threshold conditions may be determined during a calibration period. In yet another method alarm thresholds are established over time by analyzing user responses. In yet another approach alarm thresholds are established by observing sensor readings over time periods recognized as significant such as weekends, holidays, workdays, or seasons. In step 214 of method 200, then, the initial sensor readings recorded in step 212 of method 200 are used to establish initial temperature and optional external environmental sensor thresholds. Step 226 of method 200 defines an alarm condition as a deviation by some fixed deviation from established thresholds. After the initial sensor threshold conditions are set in step 214, step 216 of method 200 then implements an optional sampling delay. In one embodiment 10 milliseconds is used, although this sampling period could be changed based upon the digital sampling criteria needed for any associated optional sensor. After the delay implemented in step 216 of method 200 expires, step 218 of method 200 records the optional current PIR Motion Sensor 34 state and updates an associated sensor filtering algorithm. In step 220 of method 200 the firmware checks whether either a one second or one minute interval has elapsed. Although one second and one minute intervals are conveniently chosen for digital input and temperature sensor measurements, it will be recognized that other similar intervals could be chosen. If neither a one second nor one minute interval has elapsed, then step 216 of method 200 is executed, followed by step 218 of method 200. This loop will repeat until step 220 of method 200 determines that either a one second or 1 minute interval has elapsed. When step 220 of method 200 determines that a one second or 1 minute interval has elapsed, step 222 of method 200 will record one or more of temperature sensor 18, optional External Temperature Sensor 24, optional External Sensor(s) 22, Battery 16 level or external voltage 14 values. In step 224 of method 200 processing of these recorded values will occur. Step 226 of method 200 then examines the processed sensor, power and battery measurement values and determines if an Alarm condition exists. For the temperature sensors 18 and 24, an Alarm condition is defined as a deviation by some fixed number of degrees from an established threshold. If step 226 of method 200 determines that an Alarm condition exists, then step 238 of method 200 will establish new temperature thresholds for either temperature sensor 18 or optional external temperature sensor 24, if either of these was the cause of the Alarm. Step 232 of method 200 encodes the alarm, in one example as an SMS message, and step 234 of method 200 transmits the encoded alarm 312 to a social networking site 316. If the cellular account SIM 28, or similar device, used by the device in FIG. 1 is associated with an optional prepaid account, then optional step 236 of method 200 sends a query to the cellular network for the remaining prepaid balance. The response to the query will be received from the network some time later, and this will be checked for in step 230 of method 200. After step 236 of method 200 the program logic reverts to step 216 of method 200.

If step 226 of method 200 did not detect an Alarm condition, then step 228 of method 200 checks to see if an SMS message has been received by SIM 28. If so, step 228 of method 200 will process the received SMS message. Next, step 240 of method 200 checks the current cellular received signal strength. Optional step 230 of method 200 checks for a response from the cellular network to any previous queries of remaining prepaid balance.

Figure 3:
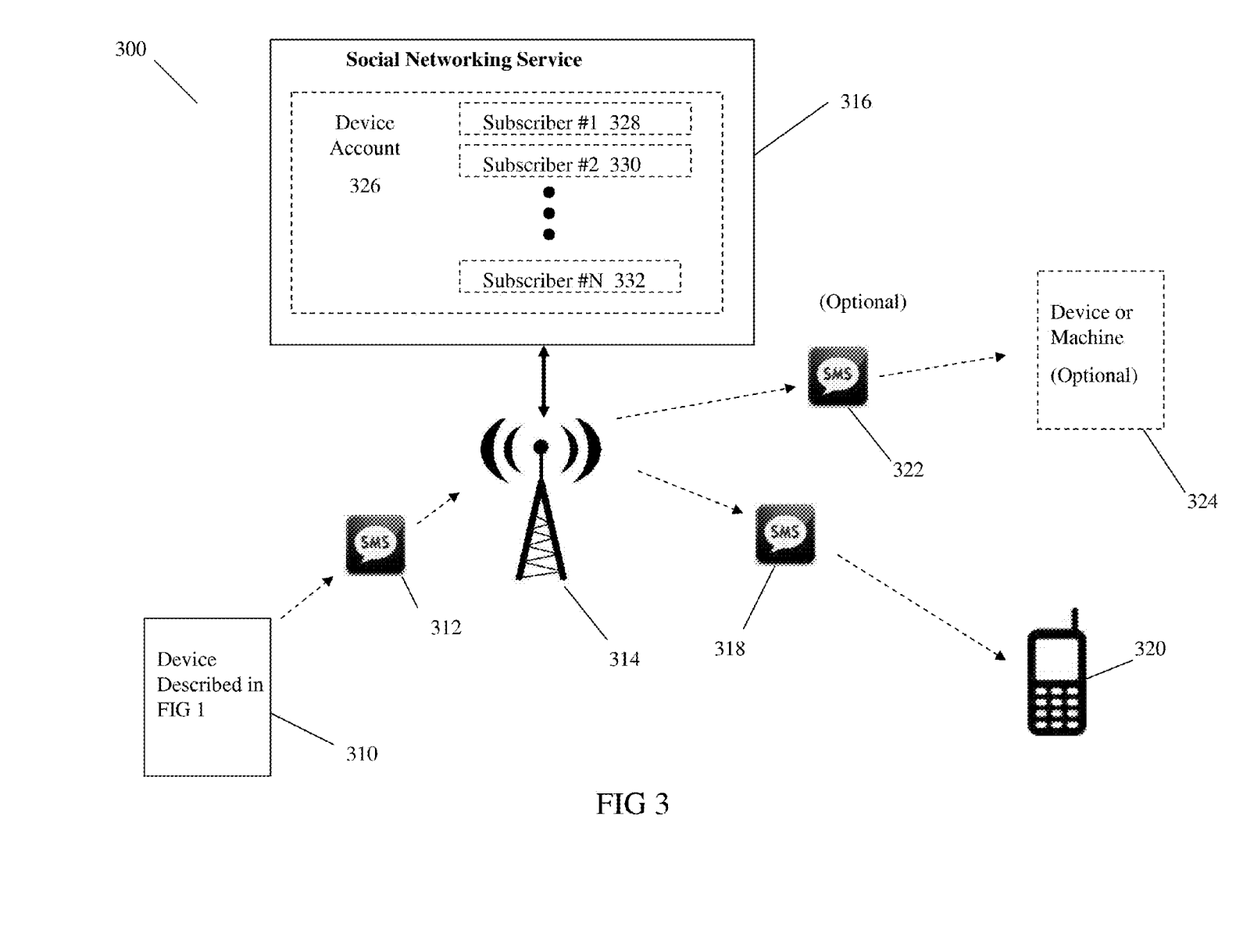
FIG. 3 is a diagram of the present invention leveraging a social networking service to deliver wireless alerts to mobile phones or devices.

FIG. 3 is a diagram of the present invention leveraging a social networking service to deliver wireless alerts to mobile phones or devices. The device described in FIG. 1 is shown in block 310 transmitting a wireless SMS alert 312 to the cellular network 314. Based upon the SMS short code destination of the wireless SMS alert message 312, it is routed by the cellular network 314 to the Social Networking Service 316. In one example the short code is 40404, which is the North American cellular short code for the Twitter social networking service. When the SMS alert message 312 is received by the Social Networking Service 316 it looks up the Device Account 326 associated with the device 310. The Social Networking Service then posts or stores the SMS alert message 312 in this Device Account 326. This completes the publication of the SMS alert message 312 to the Social Networking Service 316.

A Device Account 326 in the Social Networking Service 316 may have one or more optional Subscriber accounts 328, 330 . . . 332, associated with it. These Subscriber accounts 328, 330 . . . 332 may be associated with a user 320 or a Device or Machine 324. Any of the Subscriber Accounts 328, 330 . . . 332 which have subscriber preferences set to deliver the alert message 312 as a wireless SMS message will then cause the Social Networking Service 316 to deliver a copies 318 and optionally 322 of the SMS alert message 312 to interested followers 320 or optionally Devices or Machines 324. In the latter case, autonomous machine-to-machine (M2M) communications is thereby enabled by using the Social Networking Service 316 as an intermediary between publishing devices such as 310, and subscriber machines or devices, such as 324, which can then act upon the published information (for implementing control, in response to measured environmental conditions reported by publishing environmental monitoring devices, for example).

Figure 4:
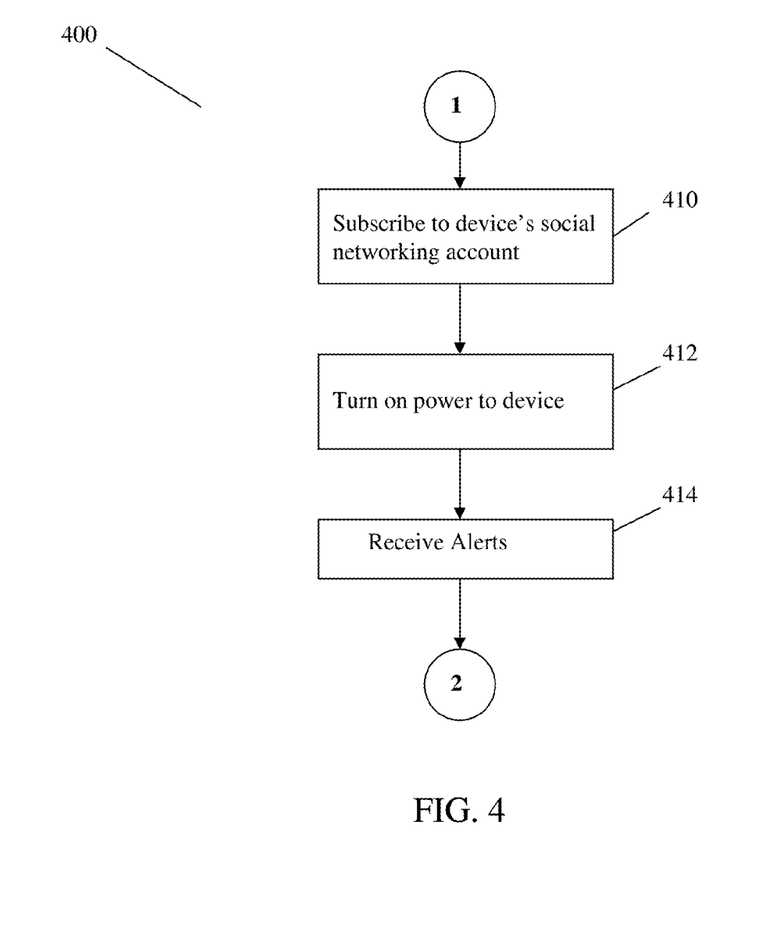
FIG. 4 is a diagram of the steps necessary to begin receiving alerts from the present invention.
Figure 5:
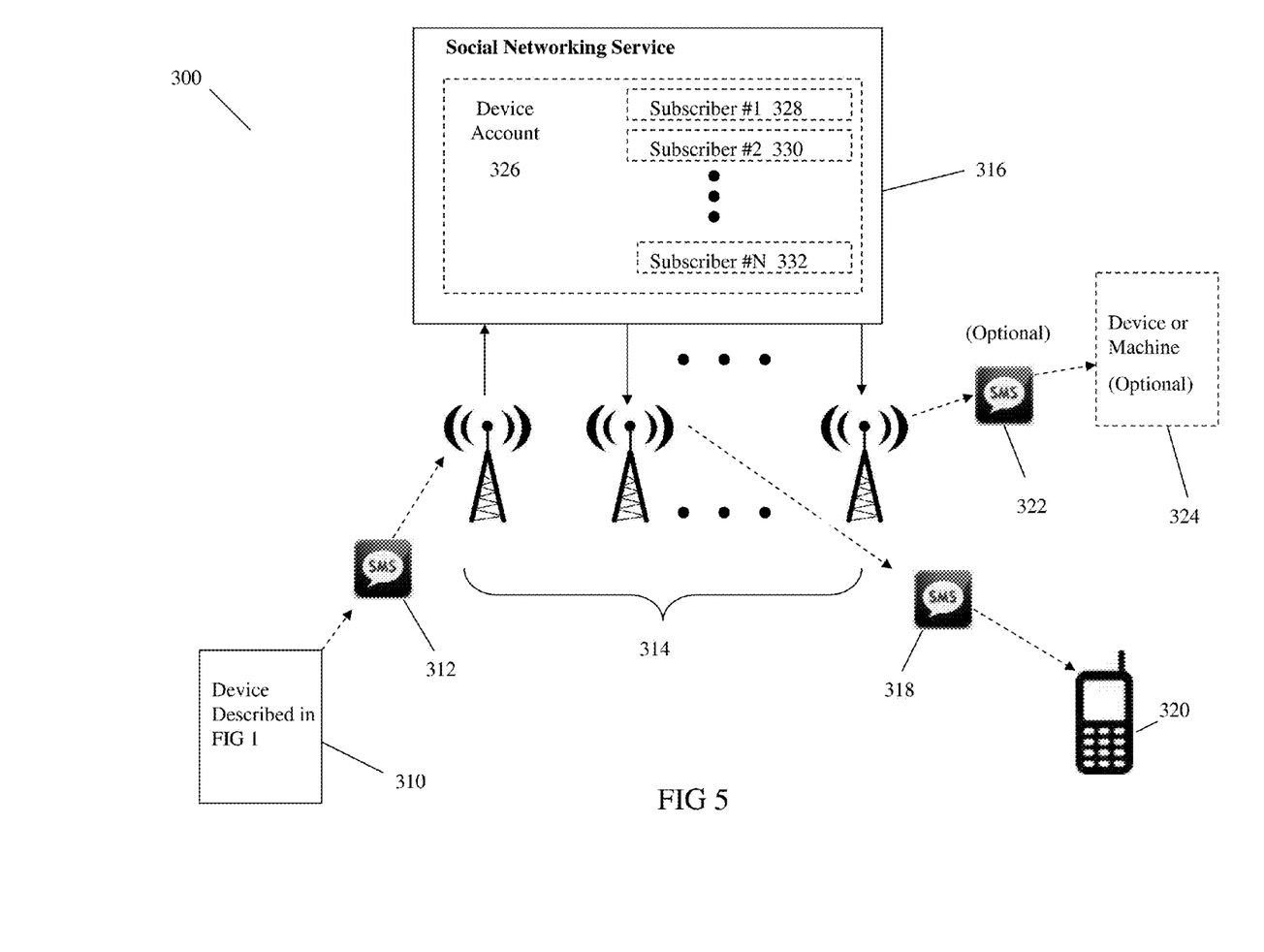
FIG. 5 is a diagram of the present invention leveraging a social networking service to deliver wireless alerts through a cellular network 314 to mobile phones or devices.

FIG. 4 is a diagram of the steps necessary to begin receiving alerts from the present invention. In step 410 of method 400 a user of the device described in FIG. 1 subscribes to its social networking account. In one example the device described in FIG. 1 is configured to transmit wireless alerts to Twitter. A user of the device described in FIG. 1 can subscribe to its alerts by following the device's Twitter account and enabling wireless SMS alert notifications to his mobile device. In step 412 of method 400 the user turns on power to the device described in FIG. 1. The alarm system is now enabled whereby in step 414 of method 400 wireless alerts are now received by the user on his mobile phone.

We claim:

1. A method of efficiently monitoring a controlled environment of a refrigeration device using a local monitoring device at the refrigeration device employing first-stage filtering criteria and using a remotely-located central monitoring site employing second-stage filtering criteria, the method comprising the steps of:
   a) The local monitoring device sensing an initial temperature within a refrigeration device;
   b) The local monitoring device periodically sensing subsequent temperatures within the refrigeration device over a period of time that is of sufficient duration to include a defrost cycle of the refrigeration device;
   c) The local monitoring device recording temperature data in the local monitoring device memory that includes temperature data sensed during the defrost cycle of the refrigeration device;
   d) Processing the temperature data using the local monitoring device to learn a normal operating temperature range in the refrigeration device by applying a first set of criteria stored in the local monitoring device to exclude temperature data recorded during the defrost cycle;
   e) The local monitoring device detecting an event, the event based on a sensed subsequent temperature in the refrigeration device being outside the learned normal operating temperature range;
   f) Encoding the event into an event message, the event message including data indicating the sensed subsequent temperature;
   g) Transmitting the encoded event message to the remotely-located central monitoring site, the central monitoring site including an incident management engine configured to perform data processing and communication functions;
   h) Receiving at the central monitoring site the encoded event message;
   i) Applying a second set of criteria to the data of the event message using the incident management engine at the central monitoring site to determine an event class of the event message, then applying an event-class-specific rule set to the data of the event message to determine whether the event qualifies as an alert condition that should be transmitted to an interested party;
   j) Alerting the interested party of the alert condition in the refrigeration device via the central monitoring site transmitting an alert condition message to the interested party.

2. The method of claim 1, wherein the refrigeration device includes a refrigerator or a freezer.

3. The method of claim 1, wherein transmitting an alert condition message to the interested party includes the central monitoring site causing an SMS message to be transmitted to the interested party.

4. The method of claim 1, wherein transmitting an alert condition message to the interested party includes the central monitoring site sending an e-mail to the interested party.

5. The method of claim 1, wherein applying the first set of criteria includes the local monitoring device automatically filtering out recorded temperatures based on histogram data collected and stored by the local monitoring device during the period of time that is of sufficient duration to include a defrost cycle of the refrigeration device.

6. The method of claim 1, wherein the second set of criteria is selected from a group consisting of a time duration, temperature, rate of temperature change, direction of temperature change and temperature-change magnitude.

7. The method of claim 1, wherein the event class is selected from a group consisting of a component failure, a power failure, and a temperature-out-of-range event.

8. A method of efficiently monitoring environmental conditions of an environment using a local monitoring device employing first-stage filtering criteria and using a remotely-located central monitoring site employing second-stage filtering criteria, the method comprising the steps of:
   a) The local monitoring device sensing environmental conditions within a refrigeration device over a time interval that is of sufficient duration to include a defrost cycle of the refrigeration device;
   b) The local monitoring device recording environmental condition data including temperature sensed during the defrost cycle of the refrigeration device and storing it in the local monitoring device:
   c) Processing the environmental condition data using the local monitoring device to learn a normal operating environmental condition range of the environment by applying a first set of criteria stored in the local monitoring device to exclude the environmental condition data recorded during the defrost cycle;
   d) The local monitoring device detecting an event, the event based on a sensed environmental condition being outside the learned normal operating environmental condition range for a predefined period of time;
   e) The local monitoring device encoding the event into an event message, the event message including data indicating that the recorded environmental condition data is not within the learned normal operating environmental condition range of the environment; and
   f) The local monitoring device transmitting the encoded event message to the remotely-located central monitoring site, the central monitoring site including an incident management engine configured to perform environmental data processing and communication functions;
   g) Receiving at the central monitoring site the encoded event message;
   h) Applying a second set of criteria to the data of the event message using the incident management engine at the central monitoring site to determine an event class of the event message, then applying an event-class-specific rule set to the event message data to determine whether the event qualifies as an alert condition that should be transmitted to an interested party;

i) Alerting the interested party of the alert condition in the environment via the central monitoring site transmitting an alert condition message to the interested party.

9. The method of claim 8, wherein the environmental conditions include any one or more of a temperature, humidity, power-supply voltage and motion.

10. The method of claim 8, wherein sensing environmental conditions over a predetermined time interval includes sensing temperature conditions in a refrigeration device.

11. The method of claim 10, wherein the refrigeration device is a refrigerator or a freezer.

12. The method of claim 8, wherein transmitting an alert condition message to the interested party includes the central monitoring site causing an SMS message to be transmitted to the interested party.

13. The method of claim 8, wherein applying the first set of criteria includes the local monitoring device automatically filtering out recorded environmental condition data that occurred during a defrost cycle, the defrost cycle starting and finishing within the predetermined time interval.

14. The method of claim 8, wherein the second set of criteria is selected from a group consisting of a time duration, temperature, rate of temperature change, direction of temperature change and temperature-change magnitude.

15. The method of claim 8, wherein the event class is selected from a group consisting of a component failure, a power failure, and a temperature-out-of-range event.

16. A system for monitoring a controlled environment of a refrigeration device and efficiently determining an alarm condition and notifying an interested party of the alarm conditions in the controlled environment, the system comprising:

a local monitoring device configured to monitor the environment of the refrigeration device, the local monitoring device including:

a temperature sensor configured to sense a temperature within the refrigeration device;

a processor configured to receive temperature data from the temperature sensor over a period of time that is of sufficient duration to include a defrost cycle of the refrigeration device, store the temperature data, and determine a normal operating temperature range by applying a first set of criteria to identify and exclude temperature data corresponding to the defrost cycle of the refrigeration device, and configured to detect an event based on temperature data that is outside the determined normal operating temperature range;

a transmitter in communication with the processor and configured to transmit an event message that includes the temperature data that is outside the determined normal operating range; and a remotely-located central monitoring device configured to communicate with the local monitoring device, the remotely-located central monitoring device including:

a receiver configured to receive the event message;

a processor, including an incident management engine, configured to apply a second set of criteria to determine an event class of the event message, then apply an event-class-specific rule set to the data of the event message to determine whether the event qualifies as an alert condition that should be transmitted to an interested party, and configured to cause an alert condition message to be transmitted to an interested party.

17. The system of claim 16, wherein he central monitoring site is configured to cause an alert condition message to be transmitted in the form of an SMS message or an e-mail.

18. The system of claim 16, wherein applying the first set of criteria includes filtering out recorded temperatures based on histogram data collected during the defrost cycle.

19. The system of claim 16, wherein the second set of criteria is selected from a group consisting of a time duration, temperature, rate of temperature change, direction of temperature change and temperature-change magnitude.

20. The system of claim 16, wherein the event class is selected from a group consisting of a component failure, a power failure, and a temperature-out-of-range event.

* * * * *

UNITED STATES PATENT AND TRADEMARK OFFICE
CERTIFICATE OF CORRECTION

Page 1 of 3

PATENT NO. : 9,501,782 B2
APPLICATION NO. : 14/222174
DATED : November 22, 2016
INVENTOR(S) : Felgate et al.

It is certified that error appears in the above-identified patent and that said Letters Patent is hereby corrected as shown below:

On the Title Page

Column 1, Item (51), under "Int. Cl.", Lines 1-3, delete
"*H04M 11/04* (2006.01)
*G06Q 30/02* (2012.01)
*G08B 27/00* (2006.01)" and insert -- *H04M 11/04* (2006.01) --, therefor.

Column 1, Item (52), under "U.S. Cl.", insert -- USPC .................. 455/404.1; 455/418, 419, 420, 423, 466 -- after CPC Class.

In the Figure, delete "  " and insert --  --, therefor.

Signed and Sealed this
Sixth Day of June, 2017

Michelle K. Lee
*Director of the United States Patent and Trademark Office*

CERTIFICATE OF CORRECTION (continued)
U.S. Pat. No. 9,501,782 B2

In the Claims

In Column 10, Line 2, Claim 1, delete "party;" and insert -- party; and --, therefor.

In Column 10, Line 41, Claim 8, delete "device:" and insert -- device; --, therefor.

In Column 10, Line 56, Claim 8, delete "environment; and" and insert -- environment; --, therefor.

In Column 11, Line 4, Claim 8, delete "party;" and insert -- party; and --, therefor.

In Column 12, Line 28, Claim 17, delete "he" and insert -- the --, therefor.